US011415178B2

(12) United States Patent
Fritz et al.

(10) Patent No.: US 11,415,178 B2
(45) Date of Patent: Aug. 16, 2022

(54) METHOD FOR ASSEMBLING A TAPERED ROLLER BEARING, AND ASSEMBLY UNIT FOR THIS PURPOSE

(71) Applicant: AKTIEBOLAGET SKF, Gothenburg (SE)

(72) Inventors: Dominik Fritz, Würzburg (DE); Denny Fritze, Schweinfurt (DE); Michael Reugels, Knetzgau (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/397,127

(22) Filed: Aug. 9, 2021

(65) Prior Publication Data

US 2022/0065302 A1    Mar. 3, 2022

(30) Foreign Application Priority Data

Sep. 2, 2020 (DE) .......................... 102020211035.2

(51) Int. Cl.
*F16C 43/06* (2006.01)
(52) U.S. Cl.
CPC ................. *F16C 43/065* (2013.01)
(58) Field of Classification Search
CPC ......... Y10T 29/49636; Y10T 29/49643; Y10T 29/49647; Y10T 29/49645;

(Continued)

(56) References Cited

U.S. PATENT DOCUMENTS 4,915,513 A * 4/1990 Orain .................... F16C 19/364
  384/589
5,046,248 A * 9/1991 Lederman ............... F16C 33/62
  29/898.041

(Continued)

FOREIGN PATENT DOCUMENTS

DE      60214350 T2   10/2007
JP     2013024377 A    2/2013

(Continued)

OTHER PUBLICATIONS

Examination Report from the German Patent Office dated May 5, 2021 in related German application No. 10 2020 211 035.2, and translation thereof.

(Continued)

*Primary Examiner* — Sarang Afzali
*Assistant Examiner* — Darrell C Ford
(74) *Attorney, Agent, or Firm* — J-Tek Law PLLC; Scott T. Wakeman; Mark A. Ussai

(57) ABSTRACT

A method for assembling a tapered roller bearing includes providing a first rolled-on surface element having a raceway and an axial end surface and mounting a plurality of tapered rollers separated by a plurality of bearing cage segments or by a plurality of roller spacers on the raceway, where each of the plurality of tapered rollers has a frustoconical rolling surface and a circular end surface meeting at a junction. Also placing at least one assembly ring around the plurality of tapered rollers to hold the plurality of tapered rollers against the first rolled-on surface element, and moving a second rolled-on surface element coaxially toward the first rolled-on surface element such that a portion of the second rolled-on surface element contacts the at least one assembly ring and pushes the at least one assembly ring axially off the plurality of tapered rollers.

20 Claims, 3 Drawing Sheets

(58) Field of Classification Search
CPC .......... Y10T 29/49679; Y10T 29/4968; Y10T 29/49682; Y10T 29/49684; Y10T 29/49686; F16C 43/06; F16C 43/065
USPC ................ 29/898, 898.04, 898.041, 898.06, 29/898.061–898.064
See application file for complete search history.

(56) References Cited

U.S. PATENT DOCUMENTS

| | | | | |
|---|---|---|---|---|
| 5,735,612 | A * | 4/1998 | Fox | F16C 35/063 384/571 |
| 8,713,800 | B2 * | 5/2014 | Friedl | F16C 43/06 29/898.07 |
| 2006/0117567 | A1 | 6/2006 | Leimann | |
| 2007/0193032 | A1 * | 8/2007 | Takimoto | F16C 33/7813 29/434 |
| 2007/0286538 | A1 * | 12/2007 | Mizutani | F16C 33/1075 384/114 |
| 2008/0235933 | A1 * | 10/2008 | Putt | F16D 1/096 29/525.01 |
| 2008/0304782 | A1 | 12/2008 | Leimann | |
| 2011/0249931 | A1 * | 10/2011 | Omoto | F03D 80/70 29/898.04 |
| 2014/0013603 | A1 * | 1/2014 | Miyachi | F16C 41/04 29/898.064 |
| 2016/0069389 | A1 | 3/2016 | Bell et al. | |
| 2016/0319869 | A1 | 11/2016 | Watanabe et al. | |
| 2018/0252268 | A1 * | 9/2018 | Maruyama | B25B 27/06 |

FOREIGN PATENT DOCUMENTS

| | | |
|---|---|---|
| JP | 2017166614 A | 9/2017 |
| WO | 2019156720 A1 | 8/2019 |

OTHER PUBLICATIONS

Examination Report and Search Report from the European Patent Office dated Jan. 10, 2022 in related application EP 21 191 898.2, and translation thereof.

* cited by examiner

METHOD FOR ASSEMBLING A TAPERED ROLLER BEARING, AND ASSEMBLY UNIT FOR THIS PURPOSE

CROSS-REFERENCE

This application claims priority to German patent application no. 10 2020 211 035.2 filed on Sep. 2, 2020, the contents of which are fully incorporated herein by reference.

TECHNOLOGICAL FIELD

The disclosure is directed to a method for assembling a tapered roller bearing and an assembly unit for this purpose.

BACKGROUND

In particular with larger and/or specially configured tapered roller bearings, the assembling of a tapered roller bearing as such and/or with installation into the installation environment of the tapered roller bearing requires a distinct method and/or precautions.

SUMMARY

An aspect of the present disclosure is therefore to provide an improved method for the assembling of a tapered roller bearing and an improved assembly unit for this purpose.

The assembly unit includes a first rolled-on surface element including a flange, tapered rollers that are disposed on the first rolled-on surface element and supported by the flange, and an assembly aid. During the assembly process, the first rolled-on surface element, which can be an inner ring, for example, is placed on an end side. The tapered rollers are placed on the first rolled-on surface element such that they abut by their end surface against the flange. During further assembly steps, the flange serves to hold the tapered rollers so that they cannot slip from the first rolled-on surface element.

In particular if a segmented cage for the rollers, or roller spacers disposed between the rollers, do not include a structure that holds together the assembly unit in an essentially vertically oriented main axis of the rolled-on surface element, due to the force of gravity the tapered rollers can tip away from the first rolled-on surface element. In order to be able to assemble the tapered roller bearing without the tapered rollers tipping away, the assembly aid is configured to contact the tapered rollers on an end region of the tapered rollers, and to enclose the tapered rollers annularly so that the assembly unit holds together until an assembly of the tapered roller bearing. The assembly aid thus holds the tapered rollers against the first rolled-on surface element and counteracts the force of gravity so that the tapered rollers do not tip out. The assembly aid is furthermore configured to be slipped off during the assembling of the assembly unit by contact with a second rolled-on surface element for the tapered rollers. The second rolled-on surface element can be, for example, a housing or an outer ring. In this way the assembly aid can be removed in a simple manner. In the assembled state, the tapered roller bearing then includes, as usual, the first rolled-on surface element, the second rolled-on surface element and tapered rollers disposed therebetween.

According to one embodiment, the assembly aid is disposed such that it contacts the tapered rollers in the transition region from tapered roller jacket (e.g., the frustoconical rolling surface of the roller) to tapered roller end side (e.g., the circular end faces of the roller). In particular, the assembly aid contacts the tapered rollers on the tapered roller end side on which the tapered rollers abut against the flange. Here the assembly aid can be particularly simply slipped off by the installation of the second rolled-on surface element. At this point the assembly aid simultaneously counteracts the force of gravity that can cause a tipping-out of the tapered rollers.

According to a further embodiment, the assembly aid includes an inner ring and an outer ring, wherein the inner ring contacts the tapered rollers and in particular is not configured closed, and wherein the outer ring is disposed around the inner ring and is configured to close the inner ring. Since the inner ring is not configured closed, it can be laid or snapped around the tapered rollers in a simple manner.

According to a further embodiment, the inner ring is formed from a material that is configured to protect the tapered roller surfaces from damage and has a required softness. The material can include, for example, rubber, plastics, or the like. This ensures that the tapered roller surfaces are not damaged during assembly.

The outer ring can be formed from a material that provides a mechanical strength and retaining forces. For example, the outer ring can be configured as PET packing tape or the like. Such a PET tape is stable and ensures during the assembling that the inner ring remains against the tapered rollers and holds them against the inner rolled-on surface element. After the assembling, when the assembly aid is slipped off, the PET tape can be simply cut through and removed, whereby the inner ring of the assembly aid, which is not closed, can also be removed.

According to a further embodiment, the assembly unit includes a cage, in particular a segmented cage, that is configured to guide the tapered rollers and to prevent a mutual contact of the rollers. The use of such a segmented cage represents advantages with respect to the weight, but the tapered rollers are not held by the cage against the rolled-on surface element, which, however, is achieved by the assembly aid described here.

The cage can be formed in particular from a plastic, in particular polyetheretherketone (PEEK). Such a plastic cage provides a light, but nonetheless stable cage. In addition, the segment cage can be fiber-reinforced. The reinforcing fibers may include in particular glass fibers, carbon fibers, or the like. In this way, the segment cage is further reinforced.

According to a further embodiment, the segmented cage includes a plurality of cage segments distributed in the circumferential direction for receiving exactly one tapered roller or a plurality of tapered rollers. In particular in the case for exactly one tapered roller, tapered rollers with a cage segment of this type, and tapered rollers not disposed in a cage segment, are alternatingly disposed in the circumferential direction. Alternatively each tapered roller can also be provided with such a cage segment, or a combination of the above is possible. These cage segments have the advantage that weight is saved since not every tapered roller is provided with a cage segment. This is specifically disadvantageous during assembly since the tapered rollers are not held by the cage against the first rolled-on surface element, but this is remedied by the assembly unit proposed here including the assembly aid.

According to a further embodiment, the tapered roller bearing forms at least a part of a main shaft bearing assembly of a wind turbine, in particular a wind turbine in the megawatt range. The main shaft bearing can include a further tapered roller bearing employed in a corresponding manner in a back-to-back arrangement or a face-to-face arrangement.

According to a further embodiment, the inner diameter of the tapered roller bearing is greater than 0.5 m, in particular greater than 1 m. Especially in such large bearings, it is advantageous to use segmented cages, as they are described above, since weight can thereby be saved.

By using the above-described assembly aid, it is possible to securely install the tapered roller bearing in the wind turbine. For example, the first rolled-on surface element, which can be an inner ring, can be pushed onto a hub of the main shaft bearing assembly. The second rolled-on surface element can form a housing of the main shaft bearing assembly.

According to a further aspect, a method is disclosed for assembling a tapered roller bearing using an assembly unit as it is described above. The method includes the following steps:

provide the assembly unit described above, pushing the first rolled-on surface element of the assembly unit, including first rolled-on surface element, tapered rollers, and assembly aid, onto a shaft or hub, pushing a second rolled-on surface element onto the tapered rollers, and slipping off the assembly aid by the second rolled-on surface element.

The features and advantages described above with respect to the assembly unit correspondingly apply to the method and vice versa.

According to a further embodiment, the method additionally includes the further steps of: separating at least one part of the assembly aid and removing the assembly aid.

For example, the assembly aid, or at least a part, for example, the outer ring, can be separated by a cutting tool or the like and subsequently removed from the assembly unit.

According to a further embodiment, the pushing on of the first and of the second rolled-on surface element is effected in the vertical direction with the assembly unit correspondingly set up on its end side. This means that the tapered rollers abut against the flange, and the flange is disposed below in the vertical direction. The second rolled-on surface element is then applied from above in the vertical direction onto the assembly unit set up on its end side.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
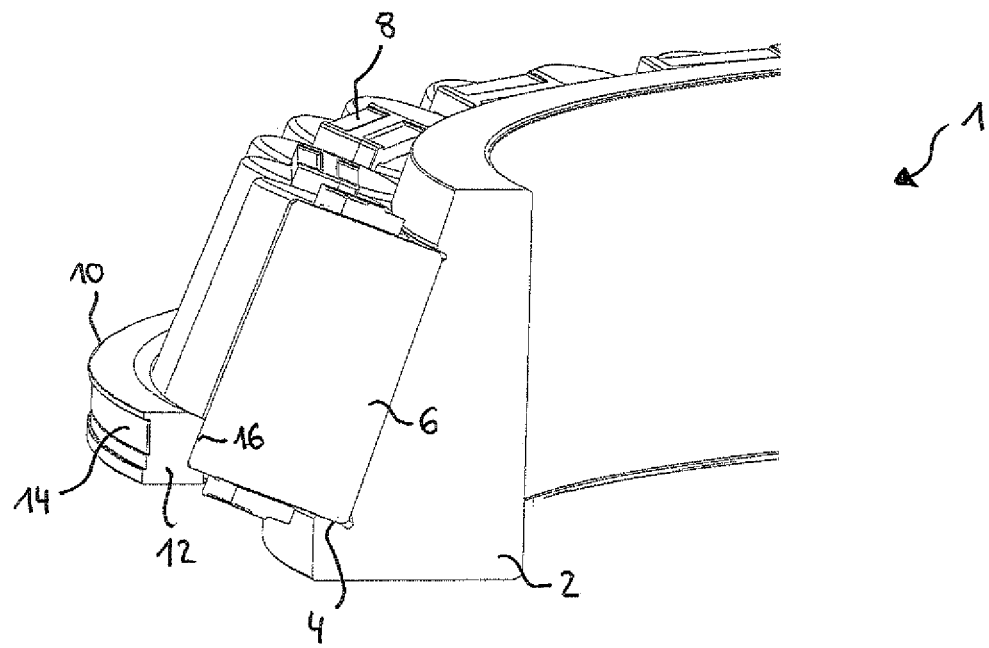
FIG. 1 is a perspective sectional view of an assembly unit including a rolled-on surface element for tapered rollers of a tapered roller bearing according to an embodiment of the present disclosure.

FIG. 1 shows an assembly unit 1 including a first rolled-on surface element 2. The rolled-on surface element 2 can be, for example, an inner ring of a tapered roller bearing. The first rolled-on surface element 2 includes a flange 4 on which tapered rollers 6 are supported. The jacket portion of the tapered rollers 6 abut against the first rolled-on surface element 2, and the end sides of the tapered rollers 6 abut against the flange 4.

The tapered rollers 6 can be provided with cage segments 8. As is shown here, every second tapered roller 6 is received in such a cage segment 8, and the remaining tapered rollers 6 is free of such a cage segment 8.

In order to simplify the assembling of the tapered roller bearing and in order to ensure that the tapered rollers 6 do not tip out of the assembly unit 1 during assembly, an assembly aid 10 is provided. This assembly aid 10 includes an inner ring 12 and an outer ring 14. The inner ring 12 includes a contact surface 16 that contacts the tapered rollers 6 at a transition region between the jacket and the end surface. The inner ring 12 is preferably not closed, that is, it includes a break, so that it can easily be deformed and disposed around the tapered rollers 6.

In order to close the inner ring 12 and fix it against the tapered rollers 6, the outer ring 14 is placed around the inner ring 12. The outer ring 14 can be, for example, a PET tape that is stable and can be easily placed around the inner ring 12. As soon as the assembly aid 10 is attached, a counter-force is exerted by it against the rollers so that they do not fall out during assembly.

Figure 2:
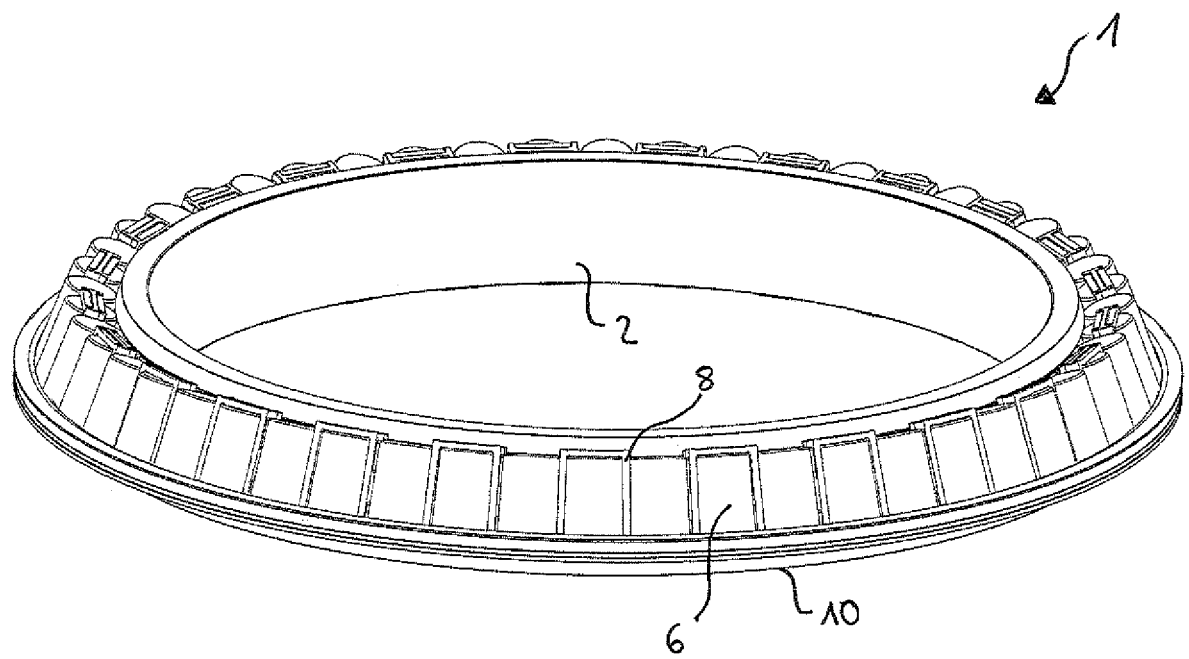
FIG. 2 is a perspective view of a first rolled-on surface element of a tapered roller bearing including tapered rollers.

As is shown in FIG. 2, after applying the assembly aid 10, the assembly unit 1 is comprised of the first rolled-on surface element 2, tapered rollers 6 disposed on the first rolled-on surface element 2, which tapered rollers 6 are received at least partially in cage segments 8, and the assembly aid 10 that is placed around the tapered rollers 6.

Figure 3:
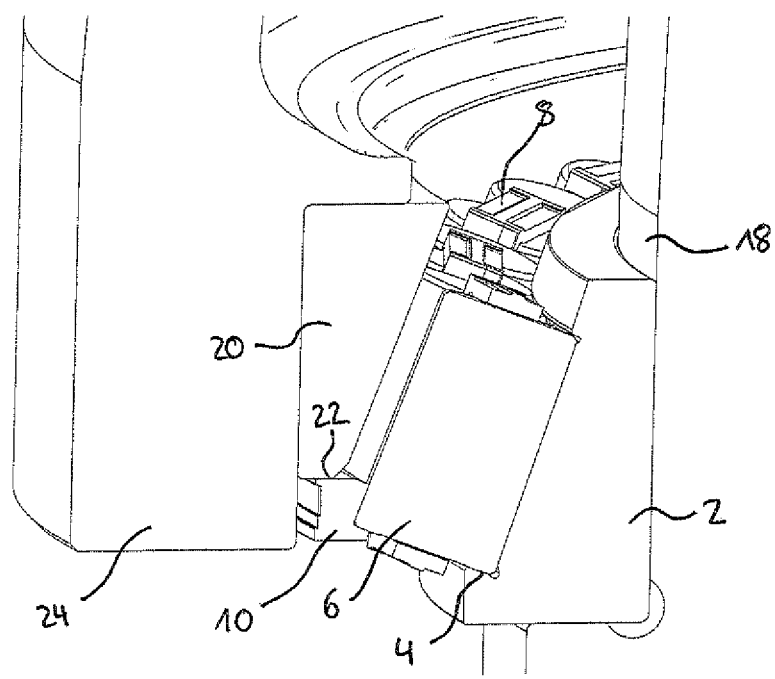
FIG. 3 is a perspective sectional view of a tapered roller bearing in a first assembly step.

FIG. 3 shows a first assembly step of the tapered roller bearing. Here the first rolled-on surface element 2 is first placed onto a shaft 18. For this purpose the first rolled-on surface element 2 is heated and subsequently pushed onto the shaft. A second rolled-on surface element 20 is subsequently disposed around the tapered rollers 6. Here a contact surface 22 of the second rolled-on surface element 20 abuts against the assembly aid 10 or the contact surface 22 presses on the assembly aid 10. The second rolled-on surface element 20 can be, for example, an outer ring that is installed in a housing 24, or can be an element of the housing 24.

Figure 4:
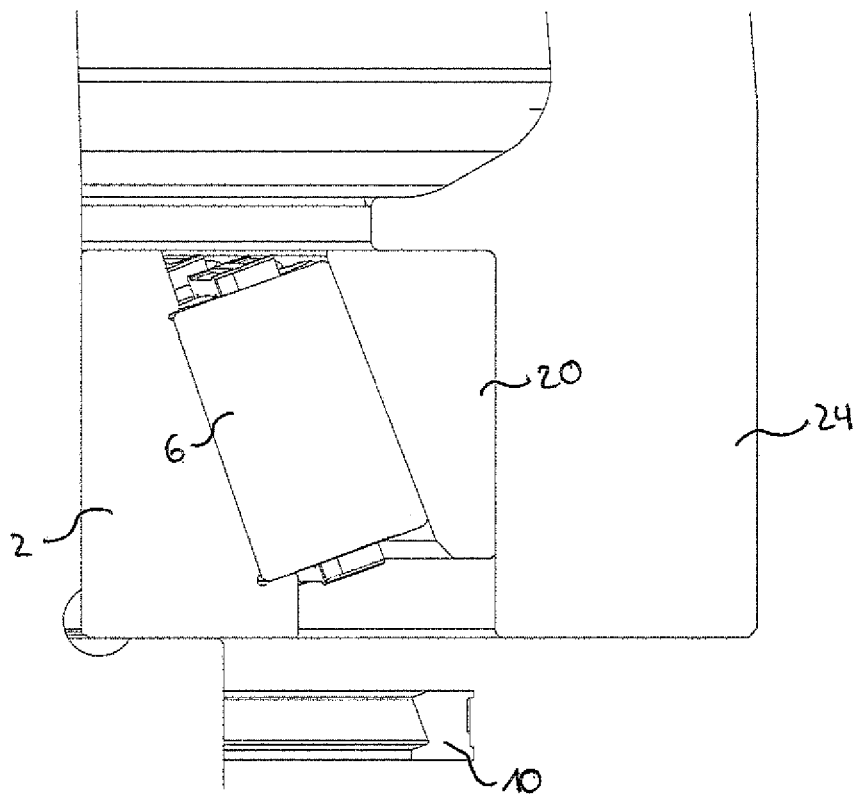
FIG. 4 is a sectional view of the tapered roller bearing in a second assembly step.

In a second assembly step of the tapered roller bearing, as is shown in FIG. 4, the second rolled-on surface element 20 is completely pushed onto the tapered rollers 6. Here the assembly aid 10 is pushed down from the tapered rollers by the second rolled-on surface element 20. In order to now remove the assembly aid 10, the outer ring 14 is first removed, for example, by cutting it.

Figure 5:
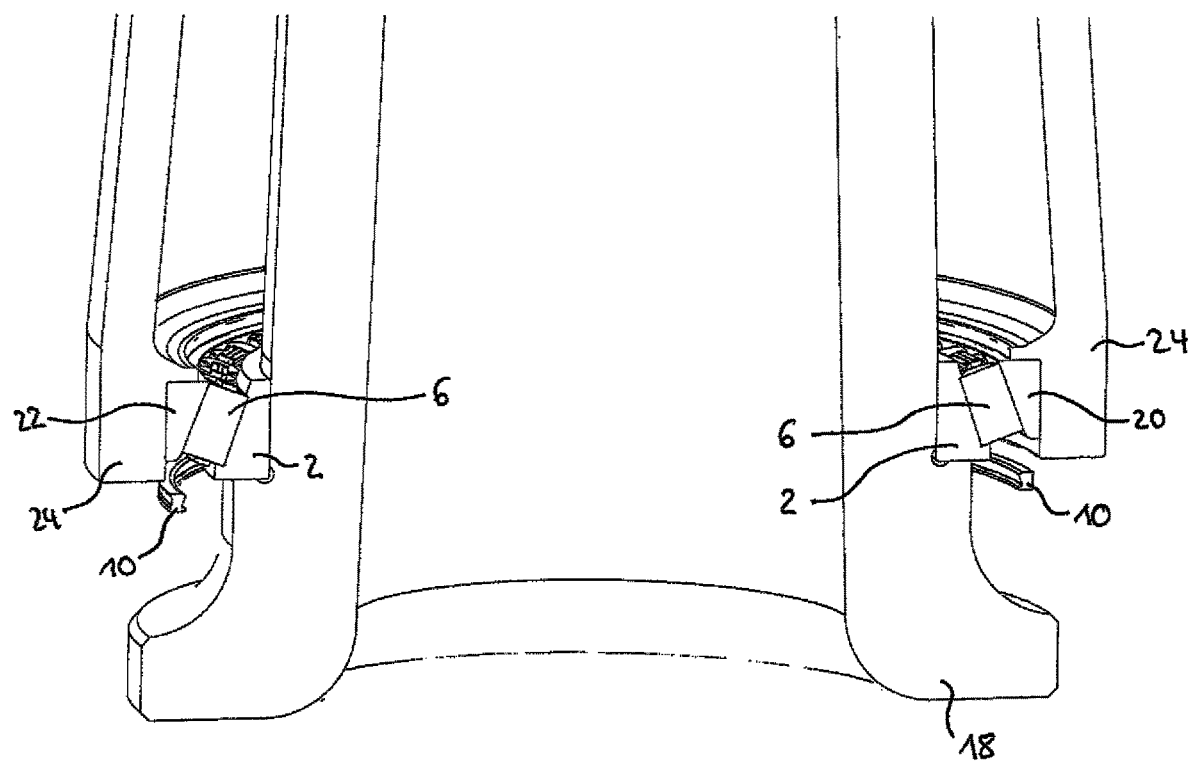
FIG. 5 is a perspective sectional view of the tapered roller bearing in a third assembly step.

As is shown in FIG. 5, in this assembly step the inner ring 12 opens after the removal or cutting of the outer ring 14, and the assembly aid can thus be removed in a simple manner from the tapered roller bearing.

Due to the assembly unit or the assembly method described here, it is possible to assemble a tapered roller bearing in a simple manner, without the tapered rollers running the risk of tipping out during the assembly. This is particularly advantageous in tapered roller bearings wherein the center of gravity of the tapered rollers lies radially outside the flange of the tapered roller bearing inner ring, since without the assembly aid used the tapered rollers would fall out of the tapered roller bearing assembly due to the force of gravity alone.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly aids and associated methods.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method for assembling a tapered roller bearing, comprising:
   providing a first rolled-on surface element having a raceway and an axial end surface,
   mounting a plurality of tapered rollers separated by a plurality of bearing cage segments or by a plurality of roller spacers on the raceway, each of the plurality of tapered rollers having a frustoconical rolling surface and a circular end surface meeting the frustoconical rolling surface at a junction,
   after mounting the plurality of tapered rollers on the raceway, placing at least one assembly ring around the plurality of tapered rollers to hold the plurality of tapered rollers against the first rolled-on surface element, and
   moving the first rolled-on surface element and/or a second rolled-on surface element coaxially and vertically toward each other such that a portion of the second rolled-on surface element contacts the at least one assembly ring and pushes the at least one assembly ring axially off the plurality of tapered rollers.

2. The method according to claim 1,
   including continuing to move the first rolled-on surface element and/or the second rolled-on surface element axially toward each other until a raceway of the second rolled-on surface element contacts the plurality of tapered rollers.

3. The method according to claim 2,
   wherein the at least one assembly ring overlies the junction and includes a first portion in contact with the frustoconical rolling surface and a second portion in contact with the circular end surface.

4. The method according to claim 3,
   wherein the first rolled-on surface element includes a flange at an end of the raceway, and
   wherein mounting the plurality of tapered rollers on the raceway comprises mounting the circular end surfaces of the rollers against the flange.

5. The method according to claim 4,
   wherein the at least one ring comprises a split inner ring and an outer ring separate from the inner ring, the outer ring being configured to secure the split inner ring to the plurality of tapered rollers.

6. The method according to claim 5,
   wherein the split inner ring is formed from an elastomer or a plastic.

7. The method according to claim 6,
   wherein the outer ring comprises a tape.

8. The method according to claim 5,
   wherein the plurality of bearing cage segments or the plurality of roller spacers are formed from polyetheretherketone (PEEK) reinforced with glass or carbon fibers, and
   wherein the plurality of bearing cage segments are not in mutual contact or the plurality of roller spacers are not in mutual contact.

9. The method according to claim 5,
   wherein the first rolled-on surface element is mounted on a shaft before the plurality of tapered rollers are placed on the raceway of the first rolled-on surface element, and
   including cutting the at least one ring after the at least one ring has been pushed off the plurality of tapered rollers to remove the at least one ring from around the shaft.

10. The method according to claim 5,
    wherein the first rolled-on surface element is mounted on a shaft before the plurality of tapered rollers are placed on the raceway of the first rolled-on surface element, and
    including cutting the outer ring after the at least one ring has been pushed off the plurality of tapered rollers and spreading the split inner ring to remove the split inner ring from around the shaft.

11. The method according to claim 10,
    wherein the shaft is configured as a main shaft bearing of a wind turbine, and
    wherein an inner diameter of the first rolled-on surface element is greater than or equal to one meter.

12. The method according to claim 2,
    including placing the axial end surface on a horizontal support surface before mounting the plurality of tapered rollers on the raceway of the first rolled-on surface element.

13. The method according to claim 1,
    wherein the first rolled-on surface element is a bearing inner ring and the second rolled-on surface element is a bearing outer ring.

14. The method according to claim 1,
    wherein placing the at least one assembly ring around the plurality of tapered rollers comprises encircling the plurality of rollers with the at least one ring assembly.

15. An assembly unit comprising:
a first rolled-on surface element having a raceway and an axial end surface,
a plurality of tapered rollers separated by a plurality of bearing cage segments or by a plurality of roller spacers mounted on the raceway, each of the plurality of tapered rollers having a frustoconical rolling surface and a circular end surface meeting the frustoconical rolling surface at an annular junction, and
at least one assembly ring around the plurality of tapered rollers and holding the plurality of tapered rollers against the first rolled-on surface element,
wherein the at least one assembly ring is configured such that the at least one assembly ring will be pushed axially off the plurality of tapered rollers in response to a raceway of a second rolled-on surface element being moved downwardly and coaxially into contact with the plurality of rollers.

16. The assembly unit according to claim 15, including the second rolled-on surface element.

17. The assembly unit according to claim 15, wherein the plurality of tapered rollers are separated by a plurality of bearing cage segments that are not in mutual contact or by a plurality of roller spacers that are not in mutual contact.

18. The assembly unit according to claim 15, wherein the first rolled-on surface element includes a flange, and where the circular end surfaces of the plurality of tapered rollers contact the flange.

19. The assembly unit according to claim 15, wherein the first rolled-on surface element is a bearing inner ring and the second rolled-on surface element is a bearing outer ring, and
wherein the at least one assembly ring encircles the plurality of tapered rollers.

20. The assembly according to claim 15, wherein the at least one assembly ring comprises a split inner ring and an outer ring separate from the split inner ring, the outer ring securing the split inner ring to the plurality of tapered rollers.

* * * * *